Figure 1:
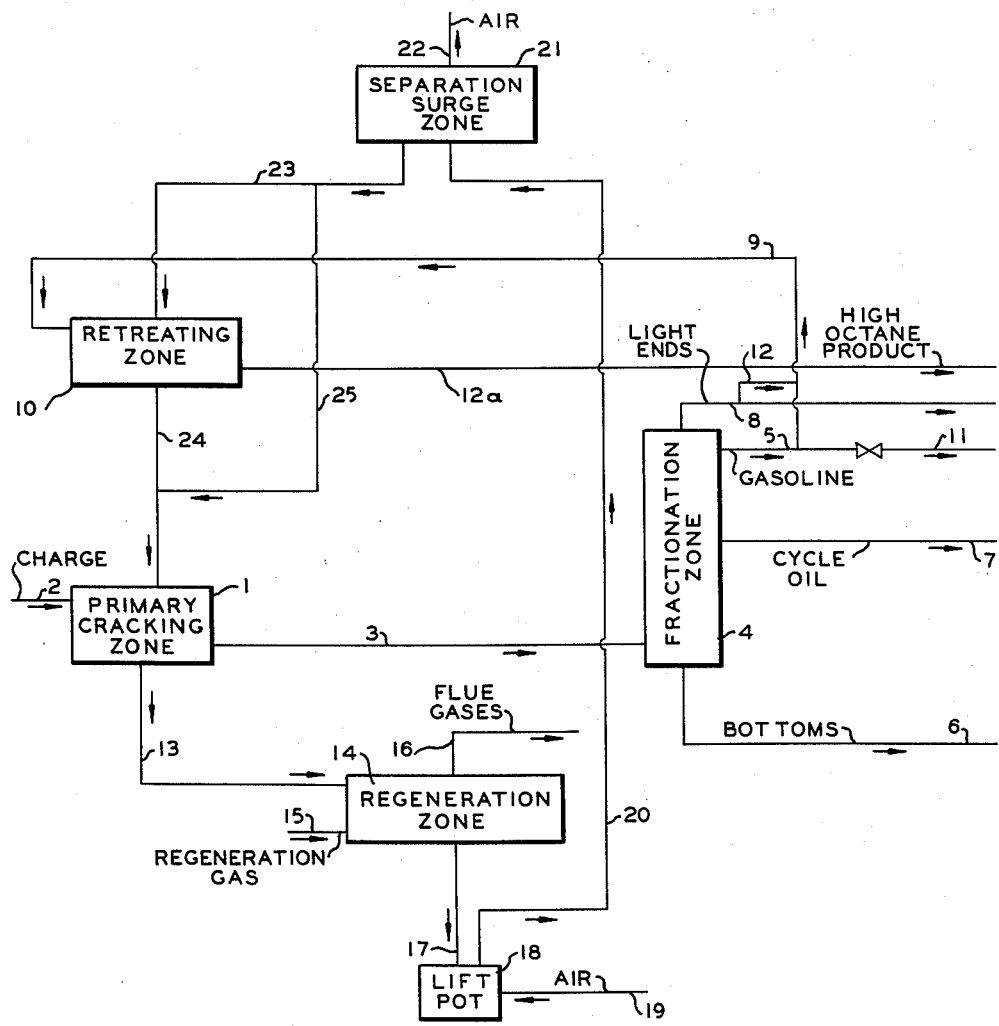

Dec. 1, 1959  K. A. HARPER  2,915,456
MOVING BED CATALYTIC SYSTEM TO UPGRADE GASOLINE
Filed Nov. 13, 1956  2 Sheets-Sheet 1

INVENTOR.
K. A. HARPER
BY Hudson + Young
ATTORNEYS

INVENTOR.
K.A. HARPER

United States Patent Office 2,915,456
Patented Dec. 1, 1959

2,915,456

MOVING BED CATALYTIC SYSTEM TO UPGRADE GASOLINE

Kenneth A. Harper, Bartlesville, Okla., assignor to Phillips Petroleum Company, a corporation of Delaware Application November 13, 1956, Serial No. 621,900

8 Claims. (Cl. 208—70)

This invention relates to the production of gasoline. In one of its aspects, this invention relates to a novel catalytic retreatment of gasoline to obtain higher octane ratings.

It is known in the art to prepare gasoline by catalytic cracking of petroleum oils and to upgrade by cracking. In recent years the requirement for high octane gasoline for internal combustion engines has been steadily on the increase and the art is continually faced with the problem of supplying more and more such gasolines. The severe treatment, extremely active catalyst and/or high temperatures, required for the production of these high octane gasolines when applied to the normal feed stocks results in excessive coking and loss of feed oil to low value hydrocarbons. For that reason, the feed oil is often first treated and the gasoline so produced in retreated under more severe conditions. However, by the previous methods, two completely separate catalyst systems are employed, or at best only a common catalyst regeneration system is employed. By such operations, duplication of equipment is required or extremely active catalyst is supplied to both reactors, with the consequential inefficient utilization of catalyst in the primary cracking zone.

An object of this invention is to provide an improved method for producing high octane gasoline. Another object of this invention is to provide a moving bed catalytic cracking system for greatest catalyst utilization efficiencies. Other objects, advantages and features of this invention will be obvious to those skilled in the art having been given this disclosure.

According to this invention, a petroleum oil is contacted with a moving bed catalyst under cracking conditions to produce a gasoline fraction, at least part of this gasoline fraction is contacted with moving bed of freshly regenerated catalyst to further treat the gasoline and the catalyst as passed to the first contacting zone for use in cracking the said petroleum oil.

Suitable feed stocks for the production of gasoline are well known in the art, examples of which include gas oil, reduced crude oil, whole crude oil, and the like. The primary reactor conditions will vary for the given feed and particular catalyst but will in general have a temperature in the range of 850 to 900° F., a pressure in the range of 12 to 18 p.s.i.g., and operate at a space velocity within the range of 1 to 5. In general, a catalyst to oil weight ratio will be within the range of 3:1 to 12:1. However, my invention is not in the particular operating conditions which are well known in the art and the conditions given are those most frequently employed.

The reaction conditions in the retreater are also known in the art, however, the general conditions in the retreater are temperature in the range of 850 to 950° F.; pressure in the range of 8 to 15 p.s.i.g.; space velocity in the range of 0.5 to 2.0 and catalyst to oil ratio in the range of 1:1 to 5:1. Since the catalyst used in the retreating zone is freshly regenerated, the temperature in this zone can be even lower than in the primary cracking zone, but will generally be 5 to 50° F. higher.

Any catalyst known to the art for hydrocarbon cracking can be employed in this invention. One commonly employed catalyst is a pelleted kaolinic type clay (Halloysite) which has been acid treated, water washed, dried, extruded into pellets, dried and calcined at 900 to 1000° F. The pellets are of about $3/16$ inch diameter and about $3/16$ inch long. These pellets are composed chiefly of silica and alumina as it known by those skilled in the art.

As has been indicated, the choice of catalyst and operating conditions is within the skill of the art, my invention being a method of operating a moving bed catalytic cracking process wherein the once-cracked gasoline is retreated either alone or in the presence of the light cracked hydrocarbons from the first-cracking operation. In one embodiment the catalyst flow is first to the retreating reactor (wherein the more refractory hydrocarbon is used for upgrading the gasoline to higher octane product) and then the partially used catalyst is charged to a second reactor (primary reactor) wherein the original hydrocarbon feed is catalytically cracked with the used catalyst. This used catalyst can be mixed with freshly regenerated catalyst if so desired. In another embodiment, catalyst from the primary reactor is regenerated and then admixed with the catalyst from the retreater and this mixed catalyst is used in both the primary reactor and the retreater with a portion of the mixed catalyst going to the retreater passing through an elutriation zone in order to remove fines. While this second embodiment is not preferred since catalyst of the same activity is fed to both reactors, it does have the advantage of regenerating only a portion of the catalyst. It is also pointed out that the retreater feed is substantially less than that of the primary reactor and consequently the catalyst requirement is smaller so that the admixture contains a preponderance of regenerated material.

Figure 2:
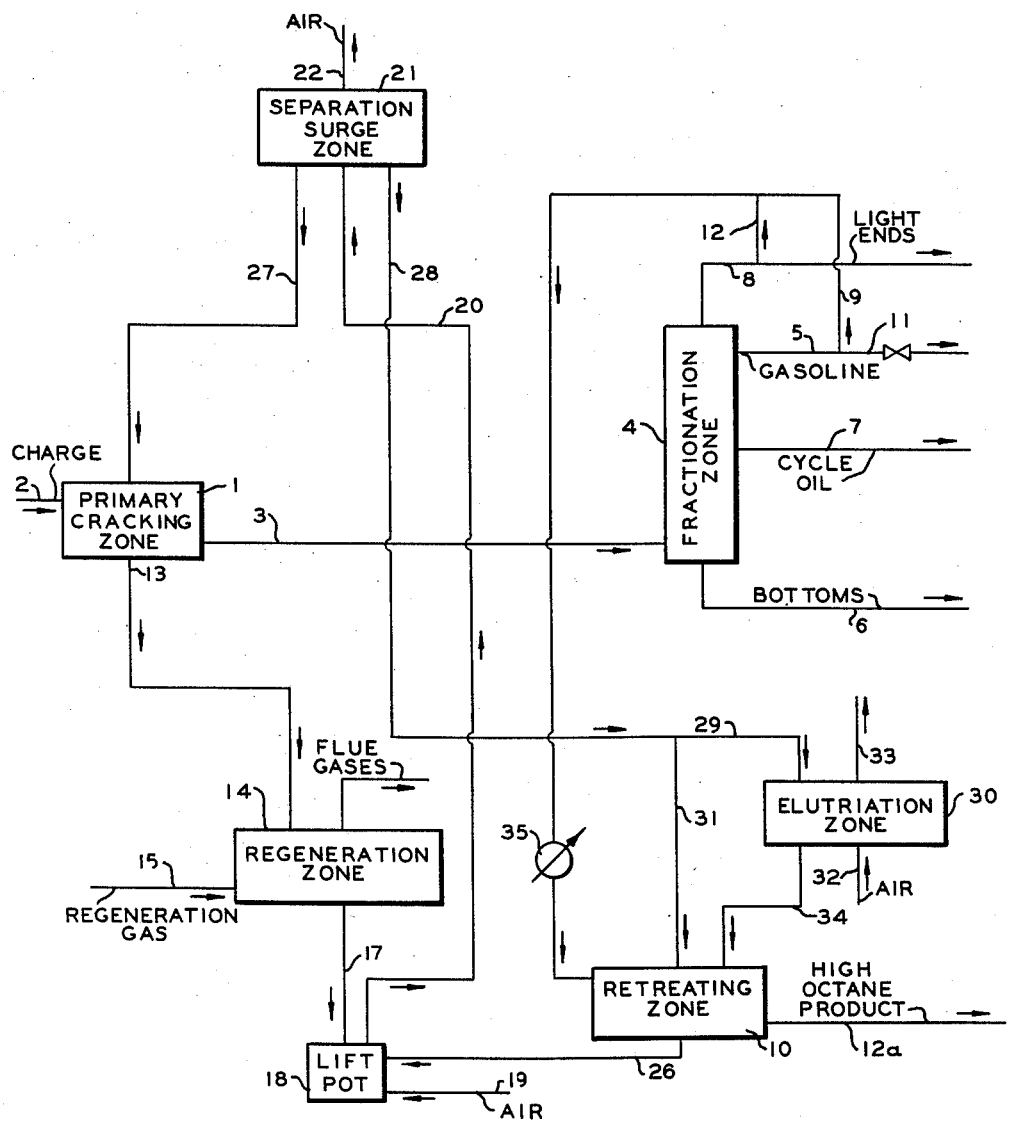

This invention will be further described with reference to the drawings of which:

Figure 1 is a block flow diagram of the preferred embodiment of my invention; and Figure 2 is a block flow diagram of an alternative embodiment of my invention.

Referring to the figures, a feed stock, e.g., gas oil, is fed to primary reactor 1 via conduit 2 wherein the charge is contacted with a moving bed catalyst. The cracked effluent is then passed via conduit 3 to fractionation zone 4 wherein the gasoline fraction is separated from the higher and lower boiling materials and is removed via conduit 5. This invention is not dependent upon the particular separation means or the number of fractions removed so long as the gasoline fraction is separated from the remaining components. In this particular embodiment, still bottoms are removed from fractionation zone 4 via conduit 6 and passed to further processing or recycling as desired. A cycle oil fraction is removed via conduit 7 and can be recycled to the primary reactor. Light ends are removed via conduit 8. The gasoline fraction removed via conduit 5 is then passed via conduit 9 to retreater 10. Conduit 11 is provided to remove a portion of the gasoline from the fractionation zone as product if so desired, however, for maximum production of high octane gasoline, all of this fraction will be retreated. Conduit 12 is provided to mix a portion of the light ends, if desired, with the gasoline fraction in conduit 9 prior to passing same to the retreater. The material from conduit 9 is contacted with a moving bed catalyst in retreater 10 to further crack the gasoline thereby upgrading same. The effluent from this zone is removed as high octane product via conduit 12a.

The catalyst from primary reaction zone 1 is discharged via conduit 13 and passes to catalyst regeneration zone 14. An oxygen containing gas such as air is admitted to zone 14 via conduit 15. This air burns coke off of the catalyst thereby heating and regenerating same. The combustion gases, i.e., flue gases, are removed via conduit 16. The catalyst passes from regeneration zone 14 via conduit 17 to lift pot 18. A gas such as air is admitted via conduit 19 to the lift pot 18 and carries the catalyst via conduit 20 to surge tank 21 wherein the gas and catalyst are separated and the gas escapes via conduit 22. This gas can be recirculated and by so doing eliminate the need for heating the lift gas. This lift gas must be hot to avoid cooling the catalyst. The freshly regenerated catalyst from surge zone 21 passes, in part, via conduit 23 to retreating zone 10 wherein it is contacted with the gasoline fraction from conduit 9. Since this zone treats only the gasoline fraction produced in zone 1, it is generally smaller than zone 1 and therefore requires less catalyst. The once contacted catalyst from zone 10 is removed via conduit 24 and is mixed with freshly regenerated catalyst withdrawn from surge zone 21 via conduit 25. This mixed catalyst is passed to zone 1 wherein it is contacted with feed oil from conduit 2. It is this catalyst which is withdrawn via conduit 13 as described.

In Figure 2, the catalyst from retreating zone 10 passes via conduit 26 to lift pot 18 wherein it is mixed with freshly regenerated catalyst from regeneration zone 14 admitted to lift pot 18 via conduit 17. This mixed catalyst is carried by air admitted to zone 18 via conduit 19 to separation surge zone 21 via conduit 20. As has been indicated, the amount of catalyst from the retreating zone is small as compared to that from the primary cracking zone so that the mixture of catalyst will be preponderantly regenerated catalyst. A portion of the catalyst from the surge zone passes via conduit 27 to primary cracking zone 1 and a portion is withdrawn via conduit 28. During the cycling of catalyst, fines are formed by attrition and these fines are undesirable since they tend to block the flow of fluids through the catalyst. For this reason the stream of catalyst in conduit 28 is broken into two streams, one passing via conduit 29 to elutriation zone 30 and the other passing via conduit 31 directly to retreating zone 10. A stream of gas such as air is admitted to elutriation zone 30 via conduit 32 which entrains the fines and carries them overhead via conduit 33. The catalyst freed of fines is then passed from zone 30 to retreating zone 10 via conduit 34 where it is mixed with the stream of catalyst from conduit 31 and is contacted with the gasoline to be retreated. In general it is preferred to operate the retreater at a somewhat higher temperature than the primary cracking zone. In the embodiment of Figure 1 this is readily accomplished since the catalyst from zone 10 which has been cooled somewhat in that zone is fed to zone 1. However, in the embodiment of Figure 2, the catalyst to each zone is supplied from a common source so the feed to zone 10 has to be heated if this zone is to operate at the higher temperature. Therefore, heater 35 is provided in conduit 9 to heat the gasoline feed to zone 10.

The flow of the embodiment of Figure 2 is otherwise the same as of Figure 1 and the same reference numerals are used for the same parts.

To further illustrate the operation of my invention, a specific embodiment is described wherein a gas oil is cracked and the gasoline fraction is retreated according to the preferred embodiment as shown by Figure 1. This specific embodiment is described in conjunction with Figure 1, however, it will be apparent to those skilled in the art that the same temperature, pressure, and rates of flow are equally applicable to the embodiment of Figure 2.

In this embodiment a commercial catalyst prepared by treating a kaolinic type clay with acid, water washing the clay to remove excess acid, drying, extruding as 3/16 x 3/16 inch pellets, drying and calcining at 900 to 1000° F. was employed. A gas oil is fed to the primary cracking zone 1 at a rate of 10,000 bbls./day. This gas oil has an API gravity, 60° F./60° F. of 28 and a boiling range of 500 to 1100° F. The catalyst to oil weight ratio is 4 to 1. The catalyst has 0.1 weight percent coke. The space velocity is 2 v./hr./v. (volume standard cubic feet gas per hour per cubic foot of catalyst). The reactor 1 operates at 880° F. and 15 p.s.i.g. The yield from this reactor as recovered in fractionation zone 4 is as follows:

Light ends (conduit 8):
  Dry gas, s.c.f./d [1] _____ 3,500,000
  $C_3$'s and $C_4$'s, bbl./d _____ 1300
Butane free gasoline (conduit 5):
  400° F. end point bbl./d _____ [2] 4000
  Research octane No. (3 cc. TEL) _____ 97.0
Cycle oils (conduit 7): Bbls./d _____ 2000
Bottoms (conduit 6): Bbls./d _____ 200

[1] The dry gas contained $H_2$, $H_2S$, $C_1$'s, $C_2$'s and some $C_3$'s. The $C_3$'s and $C_4$'s are used as feed for polymerization or alkylation and include both saturates and unsaturates.
[2] The charge to the retreater 10 is so fractionated in fractionation zone 4 to yield 4500 barrels per day (bbls./d.) of a butane free 500° F. end point stock. This includes the 4000 bbls./d. of gasoline plus the front end of the cycle oil to give this 500° F. end point charge.

In the retreater 10 the catalyst to oil ratio is 2:1 and the catalyst has a coke content of 0.02 weight percent. The space velocity in this retreater is 0.8 v./hr./v. The retreater operates at 900° F. and a pressure of 9 p.s.i.g. As indicated above the charge to this retreater is 4500 bbls./day of 500° F. end point material as recovered from the fractionator. The yield from this retreater is 3600 bbls./day of 100 octane gasoline (Research octane with 3 ccs. TEL per gallon). If the retreater is charged only with the 4000 bbls. of gasoline from the fractionator the yield is 3500 bbls. of 99 octane gasoline (Research octane with 3 ccs. TEL).

This example illustrates the preferred embodiment of my invention and should not be considered limiting, it being understood that other reaction conditions can prevail as have been indicated. It should also be obvious to those skilled in the art that similar conditions will prevail in the embodiment of Figure 2 and it is within the skill of the art to supply necessary valves, pumps, etc., as required.

I claim:

1. A process for preparing a high octane gasoline which comprises introducing a hydrocarbon oil to a first reaction zone, contacting said oil in said reaction zone with a moving bed catalyst, passing effluent from said reaction zone to a separation zone where hydrocarbons boiling in the gasoline range are removed, passing at least a portion of said gasoline to a second reaction zone, contacting said gasoline in said second reaction zone with a moving bed catalyst, removing effluent from said second reaction zone as product, removing catalyst from said second reaction zone and passing at least a part of the thus removed catalyst directly to said first reaction zone, removing catalyst from said first reaction zone and regenerating same, and passing a part of the regenerated catalyst to said first reaction zone and the remaining regenerated catalyst to said second reaction zone.

2. A process for preparing a high octane gasoline which comprises introducing a hydrocarbon oil to a first reaction zone wherein it is contacted with a moving bed catalyst, separating hydrocarbons boiling in the gasoline range from effluent removed from said first reaction zone, passing said hydrocarbon boiling in the gasoline range to a second reaction zone wherein it is contacted with a moving bed catalyst, withdrawing catalyst from said first reaction zone and regenerating same, passing a portion of said regenerated catalyst to said second reaction zone and a portion to said first reaction zone, withdrawing catalyst from said second reaction zone and passing same directly to said first reaction zone, and recovering gasoline product from said second reaction zone.

3. A process for cracking hydrocarbon oils which comprises passing hydrocarbon oil to a first reaction zone wherein it is contacted with a moving bed cracking catalyst, separating a fraction boiling in the gasoline range from effluent from said first reaction zone, passing said separated fraction to a second reaction zone wherein it is contacted with a moving bed cracking catalyst, removing effluent from said second reaction zone, removing catalyst from said first reaction zone, regenerating the thus removed catalyst, removing catalyst from said second reaction zone, admixing this last said removed catalyst with said regenerated catalyst and proportioning the resulting admixture to each of said reaction zones.

4. A process for cracking hydrocarbon oils which comprises passing hydrocarbon oil to a first reaction zone wherein it is contacted with a moving bed cracking catalyst, removing effluent from said reaction zone and separating a gasoline fraction therefrom, passing said gasoline fraction to a second reaction zone wherein it is contacted with a moving bed cracking catalyst, removing effluent from said second reaction zone, removing catalyst from said first reaction zone and regenerating same, passing a portion of the regenerated catalyst to said second reaction zone, removing catalyst from said second reaction zone, and directly passing the thus removed catalyst from said second reaction zone along with the remaining portion of regenerated catalyst to said first reaction zone.

5. A process for cracking hydrocarbon oils which comprises passing a vaporous stream of said hydrocarbon oil to a first reaction zone maintained at a temperature in the range of 850 to 900° F. and a pressure in the range of 12 to 18 p.s.i.g. wherein it is contacted with a moving bed cracking catalyst in a weight ratio within the range of 3:1 to 12:1 parts catalyst per part oil and at a space velocity within the range of 1 to 5 standard volumes of oil per hour per volume of catalyst, removing effluent from said first reaction zone, separating a hydrocarbon fraction boiling within the gasoline range from said effluent, passing the last said fraction to a second reaction zone maintained at a temperature in the range of 850 to 950° F. and a pressure in the range of 8 to 15 p.s.i.g. wherein it is contacted with a moving bed cracking catalyst in a weight ratio in the range of 1:1 to 5:1 parts catalyst per part hydrocarbon and at a space velocity in the range of 0.5 to 2 standard volumes of hydrocarbon per hour per volume of catalyst, removing effluent from said second reaction zone, removing catalyst from said first reaction zone and regenerating same, passing a portion of the regenerated catalyst to said second reaction zone, removing catalyst from said second reaction zone, and directly passing the thus removed catalyst from said second reaction zone along with the remaining portion of regenerated catalyst to said first reaction zone.

6. The process of claim 5 wherein the hydrocarbon fraction boiling within the gasoline range has an end point of 500° F.

7. The process of claim 6 wherein the catalyst is a kaolinic type clay which has been washed with an acid, washed with water, extruded into pellets, dried and calcined at a temperature in the range of 900 to 1000° F.

8. The process of claim 7 wherein the temperature of said second reaction zone is maintained above the temperature of said first reaction zone by an amount within the range of 5 to 50° F.

References Cited in the file of this patent

UNITED STATES PATENTS

| | | |
|---|---|---|
| 2,380,760 | Huff | July 31, 1945 |
| 2,409,353 | Giuliani et al. | Oct. 15, 1946 |
| 2,426,903 | Sweeney | Sept. 2, 1947 |
| 2,464,489 | Crowley | Mar. 15, 1949 |
| 2,466,051 | Shabaker et al. | Apr. 5, 1949 |